United States Patent
Park

(10) Patent No.: US 8,125,567 B2
(45) Date of Patent: Feb. 28, 2012

(54) APPARATUS AND METHOD FOR CONTROLLING THE SCREEN SIZE OF REAL-TIME VIDEO

(75) Inventor: Sang-jung Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1437 days.

(21) Appl. No.: 11/656,517

(22) Filed: Jan. 23, 2007

(65) Prior Publication Data
US 2007/0200954 A1 Aug. 30, 2007

(30) Foreign Application Priority Data
Feb. 24, 2006 (KR) .................. 10-2006-0018276

(51) Int. Cl.
*H04N 5/445* (2011.01)
*H04N 9/74* (2006.01)

(52) U.S. Cl. .................... 348/564; 348/581; 348/468

(58) Field of Classification Search ............. 348/558, 348/445, 581, 461, 468, 460, 563–565, 569; 725/32, 43, 136; *H04N 5/445, 9/74*
See application file for complete search history.

(56) References Cited

U.S. PATENT DOCUMENTS

| | | | |
|---|---|---|---|
| 5,477,274 A * | 12/1995 | Akiyoshi et al. | 348/468 |
| 7,184,093 B2 * | 2/2007 | Manning | 348/445 |
| 7,898,596 B2 * | 3/2011 | Wang | 348/468 |
| 2002/0075403 A1 | 6/2002 | Barone, Jr. et al. | |

FOREIGN PATENT DOCUMENTS

| | | |
|---|---|---|
| EP | 1 194 840 B1 | 2/2005 |
| JP | 2004-146948 A | 5/2004 |
| JP | 2004-234546 A | 8/2004 |
| KR | 10-2000-0010256 A | 2/2000 |
| KR | 2000-0010256 A | 2/2000 |
| KR | 10-2000-0059982 A | 10/2000 |
| KR | 2000-0074244 A | 12/2000 |
| KR | 10-2003-0050751 A | 6/2003 |
| KR | 10-2003-0057115 A | 7/2003 |
| KR | 10-2004-0008555 A | 1/2004 |

* cited by examiner

*Primary Examiner* — Trang U Tran
(74) *Attorney, Agent, or Firm* — Sughrue Mion, PLLC

(57) ABSTRACT

An apparatus and a method are provided for controlling the screen size of a real-time video stream. The method including receiving via a digital channel a real-time video stream and content, determining whether there is overlap between the video stream and the content, converting the screen size of the video to reduce the overlap of the video stream and the content depending on a result of the determining, and displaying the content and the video stream having the converted screen size.

23 Claims, 6 Drawing Sheets

FIG. 4

| DIGITAL CHANNEL | CONTENT IDENTIFIER | SCREEN INFORMATION | |
| --- | --- | --- | --- |
| | | SCRREN SIZE | SCREEN COORDINATES |
| COMMUNICATION SERVICE PROVIDER A | CONTENT 1 | 640 x 400 | ( 40 , 20 ) |
| COMMUNICATION SERVICE PROVIDER A | CONTENT 2 | 800 x 600 | ( 20 , 10 ) |
| COMMUNICATION SERVICE PROVIDER B | CONTENT 3 | 1024 x 768 | ( 0 , 0 ) |
| COMMUNICATION SERVICE PROVIDER B | CONTENT 4 | 1280 x 1024 | ( 0 , 0 ) |
| COMMUNICATION SERVICE PROVIDER B | CONTENT 5 | 800 x 600 | ( 10 , 10 ) |
| COMMUNICATION SERVICE PROVIDER C | CONTENT 6 | 1024 x 768 | ( 0 , 0 ) |

APPARATUS AND METHOD FOR CONTROLLING THE SCREEN SIZE OF REAL-TIME VIDEO

CROSS-REFERENCE TO RELATED APPLICATION

This application is based on and claims priority from Korean Patent Application No. 10-2006-0018276 filed on Feb. 24, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to controlling the screen size of a real-time video stream, and more particularly, to controlling the screen size of real-time video stream so that the content screen and the real-time video stream screen do not overlap when content is displayed.

2. Description of the Related Art

In related art digital broadcasts, the broadcast program is changed into digital signals, and then transmitted via a satellite or a terrestrial apparatus to the viewers, so that the broadcast program can be viewed through a digital television (TV). That is, the related art digital broadcast system is a system where every step, such as production, editing, transmission, and reception, is performed using digital signals.

An analog TV processes signals according to the types of information they contain (such as images, sound, and text), and sequentially processes a radio signal. If the picture and sound qualities are not adequate, only limited channels are provided.

A digital TV is adjusted by a computer circuit which converts an analog signal into a digital signal. The digital TV allows users to select various information and programs, without the disturbance caused by radio and noise. Therefore, various up-to-date images can be represented.

The related art digital broadcast includes a digital terrestrial broadcast (a digital broadcast provided by a general network broadcasting station), a digital satellite TV broadcast, and a digital cable TV broadcast.

The additional content as well as the digital broadcast screen can be displayed. When transmitted via a network or a digital satellite, the content can be transmitted as MPEG-2 digital Storage Media Command & Control (DSM-CC) according to the Digital Video Broadcasting-Multimedia Home Platform (DVB-MHP). When transmitted via a cable or a network, the content can be transmitted in the MPEG-2 format according to the Open Cable Application Platform (OCAP).

FIG. 1 illustrates the display of the related art digital broadcast and content, in which the digital broadcast 12 and the content 11 are displayed without overlapping. The program included in the content 11 adjusts the size of the screen containing the digital broadcast 12 to avoid overlapping, and arranges the digital broadcast 12 in a region where the content is not displayed.

FIG. 2 illustrates the case where the related art digital broadcast and the content overlap, in which a portion of the screen of the digital broadcast 21 overlaps the content screen 22.

If the overlapped region is the bottom portion of the digital broadcast 21, as shown in FIG. 2, the subtitle of the digital broadcast 21 and the content overlap, and neither can be seen.

If the content 11 can adjust the screen size of the digital broadcast 12, as shown in FIG. 1, the overlap of the digital broadcast and the content is not seen if the function is not included in the content.

The content used in the digital broadcast receiver can be an Xlet embodied by a Java application program. If the digital broadcast and the Xlet overlap, the user can watch the digital broadcast by completing the Xlet. However, the load of the digital broadcast receiver due to termination and re-starting of the Xlet may occur and there may be a delay until the Xlet re-starts.

Korean Patent Publication 2000-0059982 discloses the graphic interface device of a digital TV, comprising a control unit outputting the control signal to process a stream corresponding to the specific packet ID (PID) output from a central processing unit and storing a memory region of the processed stream, a Java-code-processing unit decoding a Java code stream according to the Java syntax, the Java code stream related to a program guide and menu icons corresponding to the PID output from the central processing unit according to a control signal of the control unit, and a second memory storing the program guide and menu icon information processed according to the control signal of the central processing unit in the Java code processing unit, and a graphic processing unit reducing the withdrawn figure of a program guide and menu icon information stored in the second memory to a the uniform size and displaying them according to the control signal from the control unit.

However, the foregoing publication only discloses a method for reducing the size of icons to a uniform size and does not provide a method that prevents the overlap of the digital broadcast and the content.

Therefore, a method that can prevent the digital broadcast and the content from overlapping is needed.

SUMMARY OF THE INVENTION

The present invention provides an apparatus and a method for controlling the screen size of a real-time video stream to prevent the content screen and the real-time video stream screen from overlapping when content is displayed.

Another object of the present invention is to The present invention also provides an apparatus and a method for controlling the screen size of a real-time video stream, wherein the screen size of a video stream is converted by storing the screen size of the video stream of the digital channel and using the stored screen size without the computing process, in case of access afterwards.

According to an aspect of the present invention, there is provided an apparatus for controlling the screen size of real-time video, the apparatus including a reception unit that receives via a digital channel the real-time video stream and the content subject to the digital channel, a control unit that checks if the video stream and the content overlap, a screen-size-converting unit that converts the screen size of the video to reduce the overlap of the video stream and the content, and a display unit that displays the video stream and the content.

According to another aspect of the present invention, there is provided a method of controlling the screen size of real-time video, the method comprising receiving via a digital channel the real-time video stream and the content subject to the digital channel, checking if the video stream and the content overlap, converting the screen size of the video to reduce the overlap of the video stream and the content depending on the result of the check performed above, and displaying the video stream and the content.

BRIEF DESCRIPTION OF THE DRAWINGS

The above and other aspects of the present invention will become apparent by describing in detail exemplary embodiments thereof with reference to the attached drawings, in which:

FIG. 4 illustrates a screen information table according to an exemplary embodiment of the present invention;

DETAILED DESCRIPTION OF THE EXEMPLARY EMBODIMENTS

Figure 1:
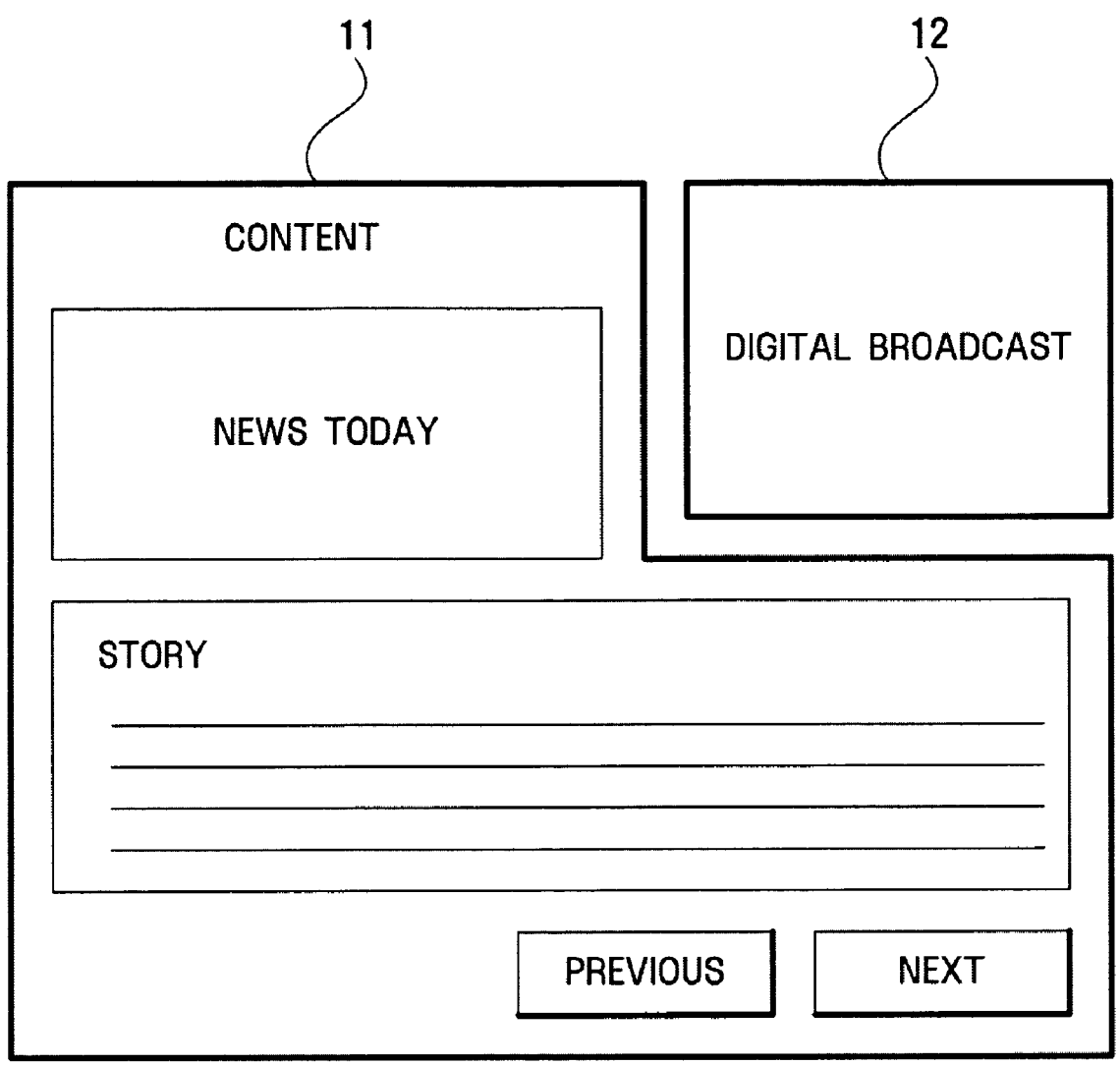
FIG. 1 illustrates the display of the related art digital broadcast and the content.
Figure 2:
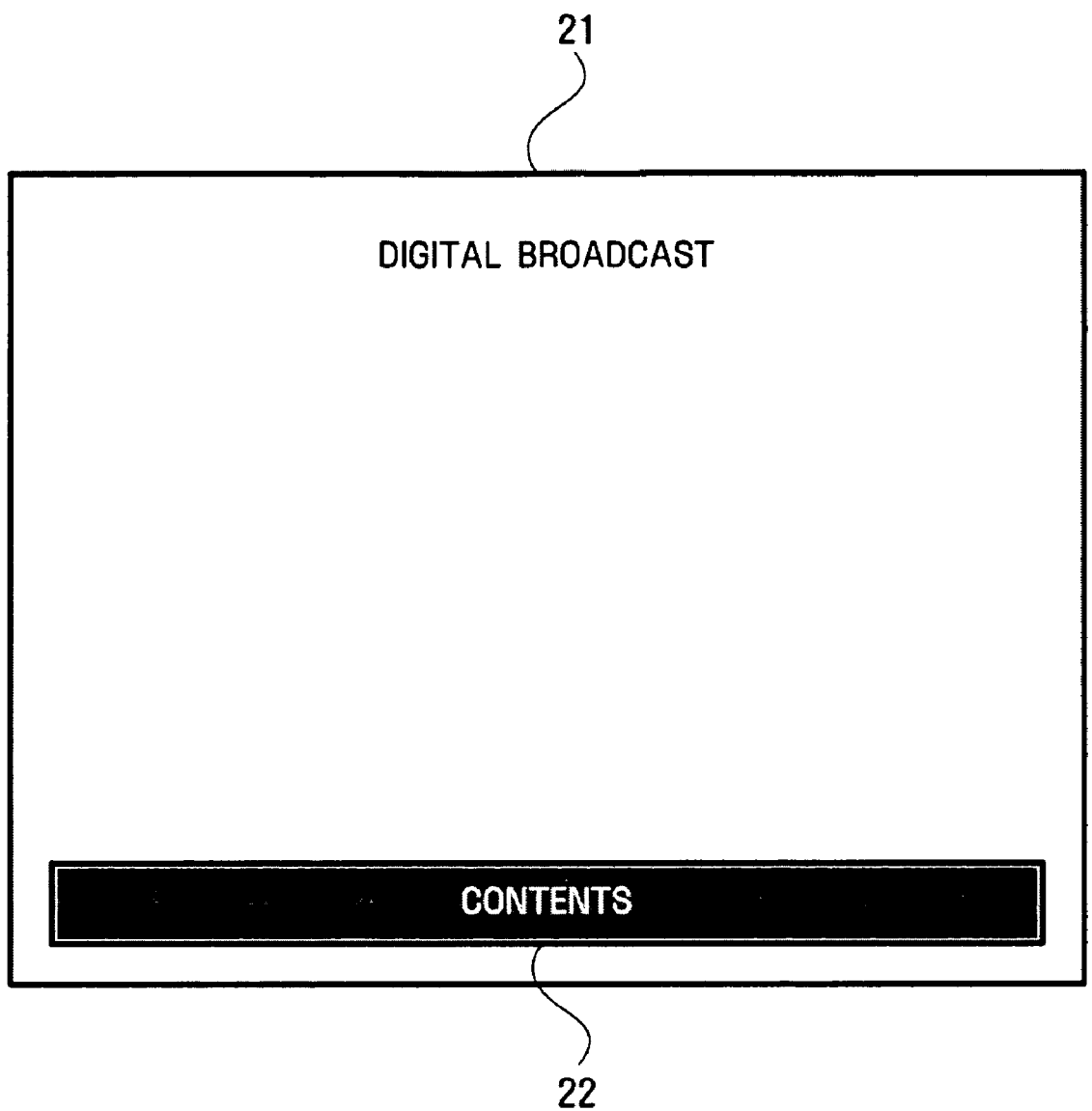
FIG. 2 illustrates the overlap of the related art digital broadcast and the content overlap.

Advantages and features of the aspects of the present invention and methods of accomplishing the same may be understood more readily by reference to the following detailed description of exemplary embodiments and the accompanying drawings. The aspects of the present invention may, however, be embodied in many different forms and should not be construed as being limited to the embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

As used in the present application, the term "unit" indicates structure as would be understood by one skilled in the art. Further, the term "unit" may also be substituted with the term "circuit" in exemplary embodiments in which a hardware circuit as would be understood by one skilled in the art is used, without departing from the scope of the invention. However, the term "unit" may also refer to software embodiments, or combined software-hardware embodiments.

Figure 3:
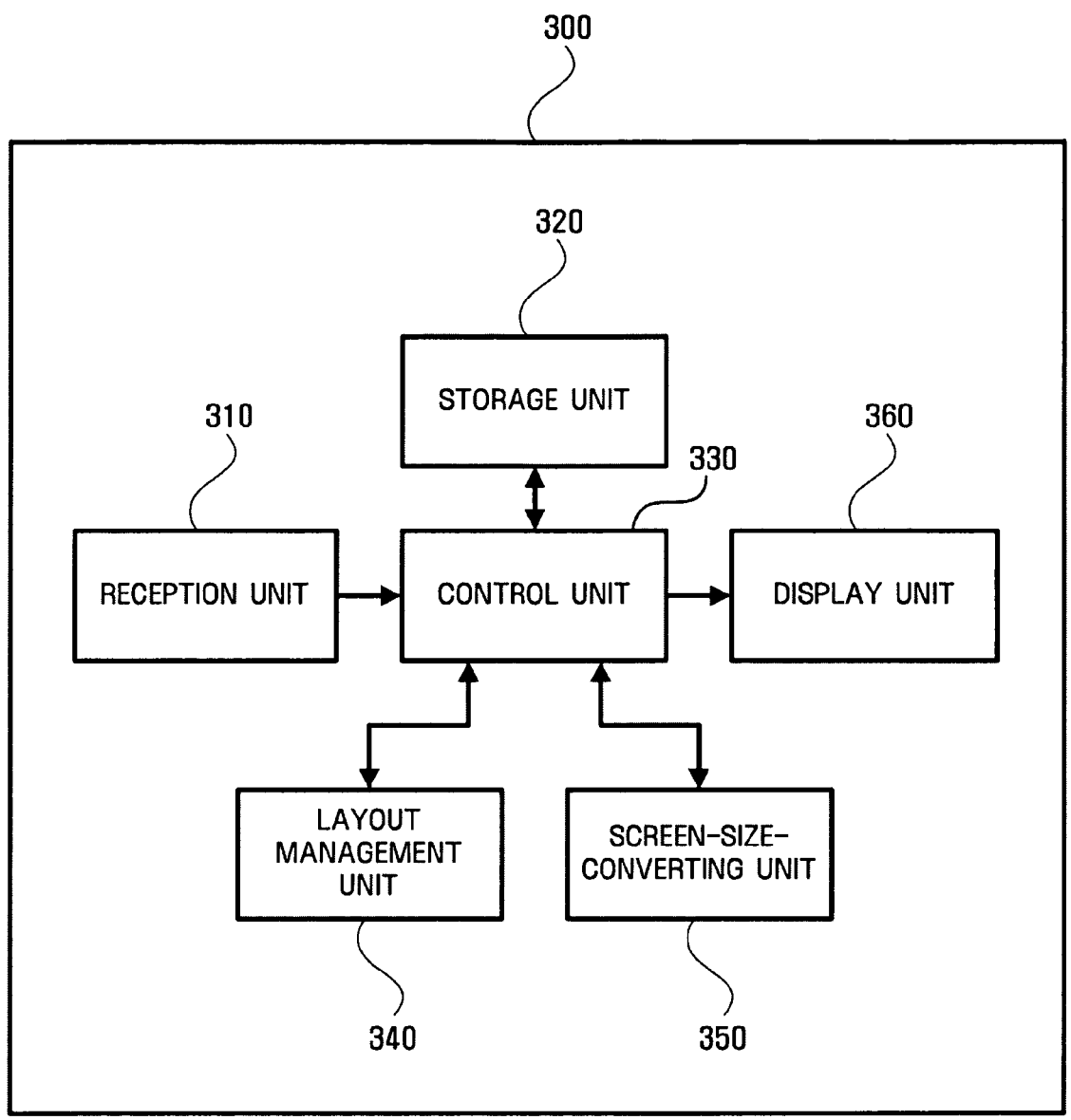
FIG. 3 is a block diagram that displays an apparatus for controlling the screen size of the real-time video stream according to an exemplary embodiment of the present invention.

FIG. 3 is a block diagram that displays an apparatus for controlling the screen size of the real-time video stream according to an exemplary embodiment of the present invention. The apparatus for controlling the screen size of the real-time video stream (hereinafter, referred to as the "multimedia apparatus") includes a reception unit 310, a storage unit 320, a control unit 330, a layout-management unit 340, a screen-size-converting unit 350, and a display unit 360.

The reception unit 310 receives via a digital channel the real-time video stream and the content. Here, the digital channel is a transmission route for the digital information which is provided by a terrestrial device, satellite, or a cable of the communication service provider that provides the digital content. Accordingly, the digital broadcast is included in the video stream.

The content subject to the digital channel is a type of information provided by the communication service provider who provides the digital channel, and the information associated with the video stream or not associated with the real-time image stream. For example, if the real-time image stream associated with sports is received, the sports-related information can be provided to the content afterwards, and information such as stock, weather, and news flash can be provided to the content regardless of the type of real-time image stream. The content can be embodied as an Xlet, and the received content is received via the reception unit 310 and stored in the storage unit 320, and may then be displayed.

When transmitted via a network or a digital satellite, the content can be transmitted by the MPEG-2 format using the DSM-CC according to the DVB-MHP standard. When transmitted via a cable or a network, the content can be transmitted in MPEG-2 format according to the OCAP standard.

That is, the reception unit 310 is a module that receives the video stream and the content provided by the digital channel, and the reception unit 310 includes a tuner and a demodulator. The video stream and the content received by the tuner are demodulated by a demodulator.

The demodulator extracts the signal of original video stream and the content from the modulated wave. The demodulator includes an automatic gain control (AGC) amplifying unit, a generating unit, an analog-to-digital (A/D) converting unit, a symbol recovery unit, and a channel decryption unit.

The AGC amplifying unit compensates the signal gains to convert the received multimedia content signal into an analog or digital signal. That is, since the received video stream signal and the content signal are substantially weak, they are amplified so that they can be normally converted into the analog or digital signals.

The generating unit generates the sampling frequency for sampling the received image stream and the content signal. The A/D converting unit converts the video stream and the content signal amplified in the AGC amplifying unit into a digital signal according to the sampling frequency generated by the generating unit.

The video stream and the content symbol converted into the digital signal are transmitted to the symbol recovery unit, and the symbol recovery unit receives the feedback with respect to a timing error of the current symbols caused by a baseband signal processing symbol to reduce the errors between the digital signal and the symbol transmitted by the A/D converting unit and the signal. Then, the symbol recovery unit removes the phase noise and the interference between the symbols, and transmits the digital signal to a channel decoding unit.

The channel decoding unit recovers the synchronism signals which have been inserted therein during the transmission from the baseband signal, and recovers the received data (that is, a video stream and a content stream) by using the recovered synchronized signals.

The demodulator may be an orthogonal frequency division multiplexing (OFDM) demodulator. An OFDM demodulator divides a single channel into a plurality of narrow-band sub channels, allocates a plurality of sub carriers that cross each other to each narrow-band channel, and modulates them for the multiplexing.

The control unit 330 checks if the video stream and the content overlap. The video stream and the content may not correlate with each other. Therefore, a part of the video stream and the content may overlap. For example, if the received real-time video stream is a movie with subtitles, the subtitles are generally placed at the bottom part of a screen. In this case, if the content is located at the bottom of the screen, the subtitles and the content may overlap.

The control unit 330 checks if the video stream and the content overlap, and is capable of checking if the extracted part and the content overlap by extracting a part of the video stream. For example, if the image included in the specific region of the video stream is not an important part in watching the video stream and if the content is not included in the specific region, the control unit 330 may determine that the video stream and the content do not overlap. To this end, the control unit 330 may include a feature-extracting unit (not illustrated) that extracts a feature of an image.

The control unit 330 has a reception unit 310, a storage unit 320, a layout-managing unit 340, a screen-size-converting unit 350, a display unit 360, and a multimedia device 300.

The screen size converting unit 350 converts the screen size of the video stream to substantially reduce the overlap of the video stream and the content. In other words, when converting the screen size of the video stream to reduce overlap, the screen size converting unit 350 converts the screen size of the video stream, permitting a small overlap to prevent an excessive reduction of the screen size of the video stream. The screen-size-converting unit 350 converts the screen size of the video stream according to the control command from the control unit 330. Accordingly, even though the video stream and the content overlap, the screen size of the video stream may not be converted. That is, when the content is arranged in a part of the video stream region that the user does not wish to view, the control unit 330 determines that the video stream and the content do not overlap, and does not transmit the command to convert the screen size of the image stream to the screen-size-converting unit 350.

The storage unit 320 stores the converted screen size of the screen stream. That is, the storage unit stores the screen size of the video stream converted by the screen-size-converting unit 350, and the converted screen size can be stored corresponding to the content of the digital channel.

The information between a screen size of the video stream and the content identifier is stored in the form of a table (hereinafter, referred to as the "screen information table"), and the screen information table will be described later in detail with reference to FIG. 4.

The storage unit 320 stores the downloaded content, and the stored content can be displayed after it is extracted according to the user's selection.

The storage unit 320 is a module wherein the information, such as a hard disc, a flash memory, a compact flash (CF) card, a secure digital (SD) card, a smart media (SM) card, a multimedia card (MMC), or a memory stick, can be input or output. It can be included in a multimedia apparatus 300 or in a separate apparatus.

As the storage unit 320 stores the screen information table, the screen size refers to the screen size of the video stream included in the screen information table, and the screen size of the corresponding video stream is converted. That is, the control unit 330 checks if the screen size of the video stream converted corresponding to the currently received content is included in the screen information table. If the converted screen size is included in the screen information table, the corresponding screen size is transmitted to the screen-size-converting unit 350. Therefore, the screen size of the video stream can be converted without a separate computing process.

A layout-management unit 340 calculates the screen size of the video stream and the content, and the coordinates to reduce the overlap of the video stream and the content. That is, if the control unit 330 determines that the received video stream and the content overlap, the control unit 330 instructs the layout management unit 340 to calculate the screen size of the video stream and its coordinates, and the screen size of the content and its coordinates.

As the layout management unit 340 calculates the screen size of the video stream and the screen size, and their coordinates, the screen-size-converting unit 350 can convert the screen size of the corresponding video stream with reference to the calculated information. That is, the control unit 330 can convert the screen size of the video stream according to the information calculated by transmitting the calculated information to the screen-size-converting unit 350.

A display unit 360 is a module including an image displaying means, such as a cathode ray tube (CRT), a liquid crystal display (LCD), a light-emitting diode (LED), an organic light-emitting diode (OLED), and a plasma display panel (PDP), displaying the video stream of the converted screen size and the content.

FIG. 4 illustrates a screen information table according to an exemplary embodiment of the present invention, the screen information table 400 including a digital channel field 410, a content identifier field 420, and a screen information field 430.

The digital channel field 410 includes information indicating the type of the digital channel. That is, the information indicates the communication service provider who provides the multimedia content via the corresponding digital channel. For example, when there are communication service providers A, B, and C, the value of 0, 1, and 2 are respectively given to them as identifier information which is inserted into the digital channel field 410.

The information indicating the type of the content (i.e., the content identifier) is included in the content identifier field 420. The content identifier is the information included in the packet containing the content, which can be created by the communication service provider who distributes the content. All content has a content identifier. The packet containing the content includes the content type, the version information, the performance priority, and the name of the content.

The screen size of the video stream and the screen coordinates are included in the screen information field 430. When the video stream is displayed in a rectangle screen, the screen size includes the width and length, and the screen coordinates can include the coordinates of the top-left corner, for example.

Since the screen-information table 400 is stored in the storage unit 320, the screen-size-converting unit 350 can convert the screen size of the video stream by using the stored screen-information table. That is, the size of the video stream can be converted without the layout management unit 340 performing computing processes. If the content identifier of the received content and the content identifier included in the screen-information table 400 are identical, the screen size converting unit 350 converts the screen size of the video stream by using the screen information corresponding to the content identifier included in the screen information table 400.

Figure 5:
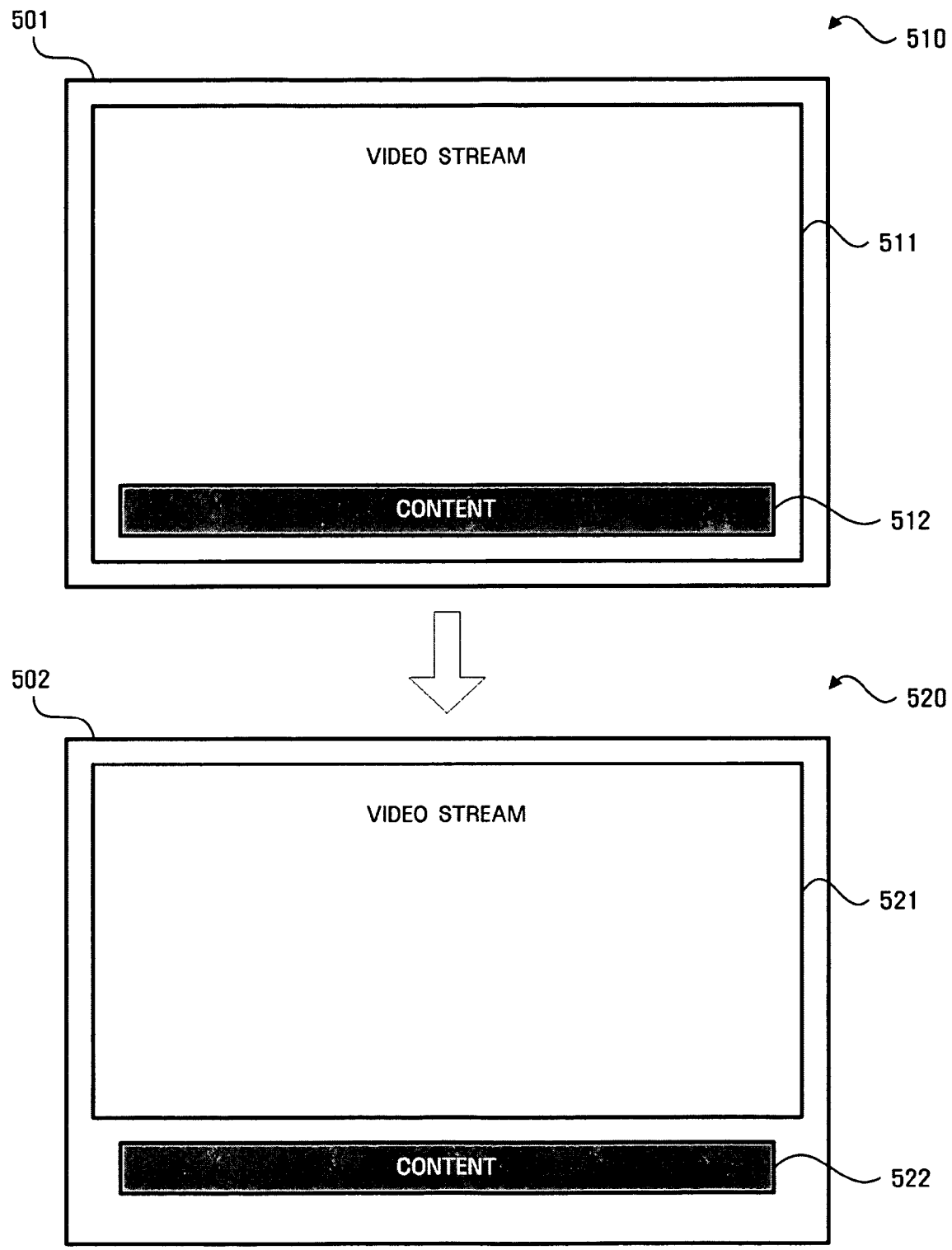
FIG. 5 illustrates the adjustment of the screen size of the video stream has been adjusted according to an exemplary embodiment of the present invention.

FIG. 5 illustrates the adjustment of the screen size of the video stream according to an exemplary embodiment of the present invention.

When a video stream 511 occupies the whole screen region 501, and the content 512 is arranged in the lower part of the screen, the overlapped area of the video stream 511 and the content 512 is created. If the overlapped region is an important part of the image stream 511, the user cannot check the important part of the video stream 511, and the details of the content 512.

The control unit 330 confirms the overlap of the video stream 511 and the content 512, and searches for the content identifier with respect to the content 512 which has been received from the screen information table 400 stored in the storage unit 320. Then, if the content identifier of the received content 512 is stored, the control unit 330 extracts the screen information of the corresponding video stream, and transmits it to the screen-size-converting unit 350. If the content identifier of the received content 512 is not stored, the control unit 330 instructs the layout-management unit 340 to calculate the screen size and the screen coordinates of the video stream 511 with the smallest overlapped region, and then transmits the calculated screen information to the screen-size-converting unit 350.

The control unit 330 transmits the converted screen information of the video stream 511 included in the screen information table 400 or the screen information of the video stream 511 calculated by the layout management unit 340 to the screen-size-converting unit 350, so that the size and the coordinates of the video stream 511 can be modified.

A screen 520 illustrates that the reduced-size video stream 521 and the content 522 that are arranged a distance from the video stream 521 are displayed on a screen region 502. Since the reduced-video stream 521 and the content 522 are arranged without overlapping, the user can recognize the information of the reduced video stream 521 and the content 522.

However, the screen 520 shows the size of the video stream 521 in the vertical direction. However, the screen-size-converting unit 350 can reduce the screen size in the horizontal as well as the vertical direction with reference to the aspect ratio of the reduced video stream 521.

If the region where the video stream and the content substantially overlap is not a part of the video stream desired for viewing, the adjustments of the screen size of the video stream by the screen-size-converting unit 350 may not be performed as mentioned above.

When the size of the overlapped region of the video stream and the content is over a threshold, the control unit 330 instructs the screen-size-converting unit 350 to convert the screen size of the video stream, and the layout management unit 340 to convert the coordinates and the size of the content, or the content to be displayed.

Figure 6:
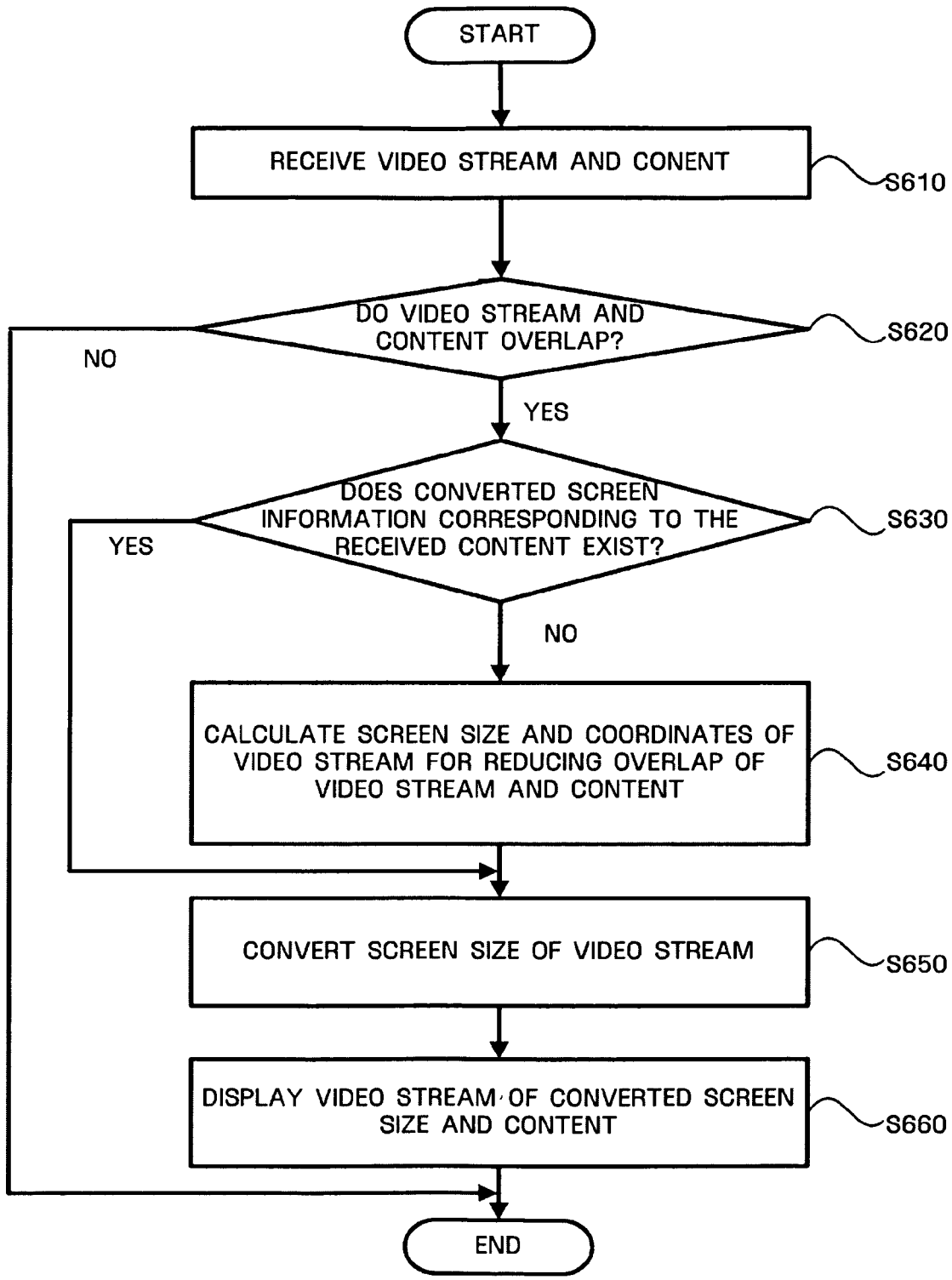
FIG. 6 is a flow chart illustrating how the screen size of the real-time video stream is controlled according to an exemplary embodiment of the present invention.

FIG. 6 is a flowchart illustrating how the screen size of the real-time video stream is controlled according to an exemplary embodiment of the present invention. Hereinafter, it is assumed that the multimedia device 300 performs in a Java environment, which corresponds to an exemplary embodiment. It should be also noted that the multimedia device 300 can operate in various environments, as would be understood by one skilled in the art.

The reception unit 310 of the multimedia device 300 receives a real-time video stream, and content subject to the digital channel to control the screen size of the real-time video stream (S610). Here, the digital channel can be provided through one of a terrestrial apparatus, a satellite, or a cable.

The content is a sort of information provided by a communication service provider who provides a digital channel, and may be embodied as an Xlet among java application programs. When the content is embodied with an Xlet, the reception unit 310 receives a content execution signal, and downloads the content.

That is, digital TV middleware included in the reception unit 310 receives a content execution signal, and checks if the received signal is for the execution of new content. If is the received signal is for the execution of new content, the reception unit 310 checks if the corresponding content is stored in the storage unit 320. If soothe corresponding content is stored in the storage unit 320, the reception unit 310 extracts the stored content; if not, the reception unit 310 downloads the content from a separate device through a network.

The digital TV middleware transmits the content to the Java virtual machine (JVM). If an automatic execution option is not included, the content can be transmitted to the JVM by the user's selection.

The JVM initializes the resources that the content uses by loading the class of the content, and converts the state of the content from pause to active. A screen-adjusting program of the real-time video stream which can directly convert the screen size of the video stream may be included in the content.

The received content is drawn in a graphical context, and the control unit 330 checks whether the video stream and the content overlap by using the drawing (S620). At this time, the control unit 330 can check if desired parts of the video stream and the content overlap. When the content overlaps a non-desired part on the image region of the video stream, the control unit 330 may determine that they do not overlap.

If the video stream and the content are confirmed to be overlapped, the control unit 330 determines if the converted screen information of the video stream corresponding to the currently received content exists in a screen information table 400 stored in the storage unit 320 (S630). That is, the control unit 330 determines if the content identifier identical to the content identifier included in the received content is included in the screen information table 400. If an identical content identifier is included in the screen information table 400, the control unit 330 extracts the converted screen information of the video stream corresponding to the content identifier, and transmits it to the screen-size-converting unit 350.

However, if the identical content identifier is not stored in the storage unit 320, the control unit 330 transmits the screen information of the currently received video stream and the content to the layout management unit 340.

The layout management unit 340 that received the screen information of the video stream and the content calculates the screen size of the video stream and the coordinates for reducing the overlapped region of the video stream and the content (S640). The calculated screen information of the video stream is transmitted to the control unit 330, and the control unit 330 updates the received screen information of the video stream after inserting the screen information into the screen information table 400, and transmits the screen information to the screen-size-converting unit 350.

That is, the control unit 330 may receive the converted screen information of the video stream from the storage unit 320, or the screen information of the video stream from the layout management unit 340, thereby transmitting one of the information.

Therefore, the screen size converting unit 350 converts the screen size of the video stream in a manner that may reduce the overlapped region of the video stream and the content by using the screen size of the received video stream (S650).

Then, the video stream with the converted screen size and the content subject to the digital channel are displayed through the display unit 360 (S660).

The layout management unit 340 may calculate the screen coordinates and the screen size of the content, and transmit the content to the screen size converting unit 350. As a result, the converted content is displayed through the display unit 360.

Each block of the block diagram illustration in FIG. 3 and each step of the flowchart illustration in FIG. 6 can be implemented by computer program instructions. These computer program instructions can be provided to a processor of a general purpose computer, special purpose computer, or other programmable data processing apparatus to produce a machine such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute in the computer or other programmable apparatus provide steps for implementing the functions specified in the flowchart block or blocks.

Further, each block of the flowchart illustrations may represent a module, segment, or portion of code, which includes one or more executable instructions for implementing the specified logical functions(s). In an alternative implementation, the functions noted in the blocks may occur out of order. For example, two blocks shown in succession may in fact be executed substantially concurrently or the blocks may sometimes be executed in reverse order, depending upon the functionality involved.

As described above, the apparatus and the method for controlling the screen size of a real-time video stream of the present invention may provide at least one of the following effects.

First, by substantially preventing the screen of the content and the screen of the real-time video stream from overlapping when the content is displayed, the user may receive the video and the information of the content effectively.

Second, by storing the screen size of the video stream of the digital channel and using the stored screen size, the screen size of the video stream may be converted, which may thereby reduce unnecessary calculation.

Third, the video stream may be converted according to the size of the content, which may change in real-time, the screen size.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be constructed as placing any limitation on the scope of the invention.

What is claimed is:

1. An apparatus for controlling a screen size of a real-time video stream, the apparatus comprising:
a storage unit;
a reception unit that receives via a digital channel the real-time video stream and a content;
a control unit that determines whether there is an overlap between the video stream and the content, and determines whether converted screen information of the video stream corresponding to the content exists in the storage unit if it is determined that there is the overlap between the video stream and the content;
a screen size-converting unit that converts the screen size of the video stream to reduce the overlap depending on results of the determinations by the control unit; and
a display unit that displays the content and the video stream having the converted screen size.

2. The apparatus of claim 1, wherein the digital channel is provided through at least one of a terrestrial apparatus, a satellite, and a cable.

3. The apparatus of claim 1, wherein the content comprises an Xlet and is provided by a communication service provider.

4. The apparatus of claim 1, further comprising a layout-management unit that calculates the screen size and the coordinates of the video stream and the content so as to reduce the overlap of the video stream and the content.

5. The apparatus of claim 4, wherein the screen size-converting unit converts the screen size of the video stream by using the calculated screen size and coordinates.

6. The apparatus of claim 1, wherein the storage unit stores the converted screen size of the video stream.

7. The apparatus of claim 1, wherein the screen-size-converting unit converts the screen size of the video stream with reference to the converted screen information existed in the storage unit if it is determined that the converted screen information exists in the storage unit.

8. The apparatus of claim 1, wherein the control unit determines that there is no overlap between the video stream and the content if the content is arranged in a part of the video stream that a user does not wish to view.

9. A method of controlling a screen size of a real-time video stream, the method comprising:
receiving via a digital channel the real-time video stream and content;
determining whether there is an overlap between the video stream and the content;
determining whether a converted screen information of the video stream corresponding to the content exists in a storage unit if it is determined that there is the overlap between the video stream and the content;
converting the screen size of the video stream to reduce the overlap depending on results of the determining; and
displaying the content and the video stream having a converted screen size.

10. The method of claim 9, wherein the digital channel is provided through at least one of a terrestrial apparatus, a satellite and a cable.

11. The method of claim 9, wherein the content comprises an Xlet and is provided by a communication service provider.

12. The method of claim 9, further comprising calculating the screen size and the coordinates of the video stream and the content so as to reduce the overlap of the video stream and the content if it is determined that the converted screen information of the video stream does not exist in the storage unit.

13. The method of claim 12, wherein the converting the screen size of the video stream comprises converting the screen size of the video stream by using the calculated screen size and coordinates.

14. The method of claim 9, further comprising storing the converted screen size of the video stream.

15. The method of claim 9, wherein the converting the screen size of the video stream comprises converting the screen size of the video stream with reference to the converted screen information existed in the storage unit if it is determined that the converted screen information of the video stream exists in the storage unit.

16. The method of claim 9, wherein it is determined that there is no overlap between the video stream and the content if the content is arranged in a part of the video stream that a user does not wish to view.

17. A non-transitory computer readable medium including a method for controlling a screen size of a real-time video stream, the method comprising:
- receiving via a digital channel the real-time video stream and content;
- determining whether there is an overlap between the video stream and the content;
- determining whether a converted screen information of the video stream corresponding to the content exists in a storage unit if it is determined that there is the overlap between the video stream and the content;
- converting the screen size of the video stream to reduce the overlap, depending on results of the determining; and
- displaying the content and the video stream having a converted screen size.

18. The non-transitory computer readable medium of claim 17, wherein the digital channel is provided through at least one of a terrestrial apparatus, a satellite and a cable.

19. The non-transitory computer readable medium of claim 17, wherein the content comprises an Xlet and is provided by a communication service provider.

20. The non-transitory computer readable medium of claim 17, further comprising calculating the screen size and the coordinates of the video stream and the content so as to reduce the overlap of the video stream and the content if it is determined that the converted screen information of the video stream does not exist in the storage unit.

21. The non-transitory computer readable medium of claim 20, wherein the converting the screen size of the video stream comprises converting the screen size of the video stream by using the calculated screen size and coordinates.

22. The non-transitory computer readable medium of claim 17, further comprising storing the converted screen size of the video stream, wherein the converting the screen size of the video stream comprises converting the screen size of the video stream with reference to the converted screen information existed in the storage unit if it is determined that the converted screen information of the video stream exists in the storage unit.

23. The non-transitory computer readable medium of claim 17, wherein it is determined that there is no overlap between the video stream and the content if the content is arranged in a part of the video stream that a user does not wish to view.

\* \* \* \* \*